June 20, 1967 J. A. AVTGES 3,326,831
NON-FOGGING CLOSURE LINERS
Filed Jan. 17, 1963
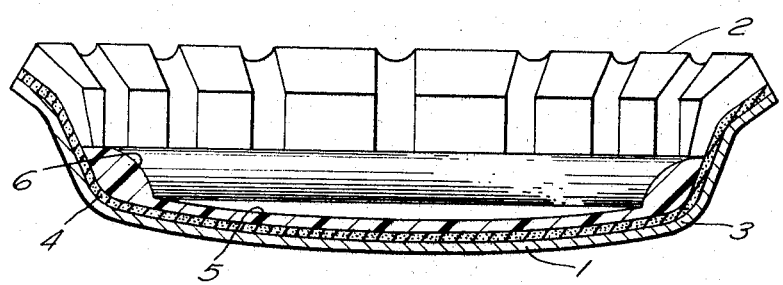

United States Patent Office 3,326,831
Patented June 20, 1967

3,326,831
NON-FOGGING CLOSURE LINERS
James A. Avtges, Watertown, Mass., assignor to W. R. Grace & Co., Cambridge, Mass., a corporation of Connecticut
Filed Jan. 17, 1963, Ser. No. 252,141
5 Claims. (Cl. 260—28.5)

This invention pertains to Plastisol compositions useful in the preparation of thermoplastic liners for container closures. More particularly, this invention pertains to Plastisol compositions useful in the preparation of transparent vinyl resin closure liners which are resistant to clouding or fogging caused principally by absorption of moisture from the container contents.

A Plastisol is defined as a dispersion of finely divided resin particles in a non-volatile liquid plasticizer in which the resin is insoluble or only very slightly soluble at room temperature but in which the resin is essentially completely soluble at elevated temperatures. Upon heating the dispersion, a substantially homogeneous solution is formed which hardens to a rubbery thermoplastic gel upon cooling.

Vinyl resin Plastisol compositions have been used in the production of gaskets and liners for crowns and other types of container closures, as is well known in the art. Though opaque or pigmented crown liners have been more widely employed, transparent liners have recently found increased utility in closures having decorative, advertising or other printing lithographed on the inner surface of the closure shell. Since the printed matter must be easily discernible visually, transparent liners must have excellent clarity, i.e. optimum "see-through" characteristics. Though transparent crown liners have been produced which possess the requisite clarity and transparency at the time of manufacture, these liners have been found to cloud or fog after only brief exposure to the container contents. In crown closures where the liner is coextensive with the top panel of the closure shell, this clouding effect is particularly objectionable since it greatly interferes with the visual identification of the material printed on the inner surface of the closure panel.

It is therefore the main object of the present invention to provide novel Plastisol compositions which are particularly useful in the preparation of transparent vinyl resin liners for container closures. It is another object of the present invention to provide transparent closure liners and gaskets which are resistant to moisture clouding and which retain excellent visual clarity and transparency when exposed to humidity for prolonged periods of time. These and other objects of the present invention will become apparent from the following description.

It has now been discovered that fog-resistant Plastisol compositions and consequently, vinyl resin closure liners of the character described may be prepared from Plastisols having a minor amount of wax incorporated therein. The wax behaves as an anti-fogging agent in the fluxed Plastisol composition with the result that the composition remains free from moisture clouding when immersed in water or when otherwise exposed to conditions of exceedingly high humidity.

Briefly stated, the Plastisol compositions of the present invention comprise a vinyl resin, a plasticizer therefor, and wax in an amount below 2 percent by weight of the total composition. In a preferred embodiment of the present invention transparent vinyl resin closure liners are prepared from a Plastisol composition consisting essentially of a vinyl resin mixture of a finely divided Plastisol resin and a coarse suspension resin, a plasticizer for said resin mixture, a stabilizer, and wax in an amount below 2 percent by weight of the total composition. In another preferred embodiment of the present invention transparent vinyl resin closure liners are prepared from a Plastisol composition consisting essentially of a vinyl resin mixture of a finely divided Plastisol resin and a coarse suspension resin, a plasticizer for said resin mixture, a stabilizer, a thickener, such as aerated colloidal silica, and wax in an amount below 2 percent by weight of the total composition. In the present invention it is preferred to use the anti-fogging agent in combination with Plastisols containing a coarse suspension resin in admixture with the Plastisol resin and especially, in Plastisols containing a resin mixture having relatively large proportions of suspension resin since such compositions are more efficient, have enhanced anti-fogging characteristics and improved transparency, besides being more economical. Still other embodiments of the invention will be apparent as the discussion proceeds.

The waxes useful as anti-fogging agents in the Plastisol compositions of the present invention are the waxes derived and recovered from crude petroleum. It has been found that these waxes when employed in only small quantities are effective in preventing fogging of the fluxed Plastisol without affecting the viscosity or other properties of the Plastisol composition. These petroleum waxes may be divided principally into two groups, namely, paraffin waxes and microcrystalline waxes. The paraffins are waxes which have a melting point in the range of approximately 115°–155° F. and are composed primarily of straight-chain molecules and crystallize into large, well-defined structures. The microcrystalline waxes generally have a higher melting point which is in the range of about 145°–175° F., possess a comparatively branched-chain structure, and form small, rather indistinct crystals. Both the paraffin and microcrystalline waxes are satisfactory when used alone with the paraffin waxes being preferred. In addition, commercially available blends of paraffins as well as mixtures of paraffins and microcrystalline waxes are also suitable for present purposes.

The quantity of petroleum wax employed in the Plastisol compositions of the present invention is very important. The petroleum wax should be used in an amount below 2 percent, preferably below 1.75 percent, and especially between 0.15 percent to 1.5 percent by weight of the total composition. In general, as a minimum quantity of wax, it is necessary to use only an amount sufficient to give optimum clarity and insure moisture resistance of the fluxed transparent vinyl resin liner. When wax is present in larger amounts the wax tends to migrate to the surface of the fluxed Plastisol composition. In the preparation of crown closure liners the presence of excess wax on the surface of the liner is undesirable since the wax flakes into the container contents. Moreover, larger amounts of wax have an adverse effect on the sealing efficiency of the liner. In order to avoid contamination of the container contents and also to maintain good sealing performance it is therefore preferred to use only small quantities of wax, i.e. below 1.5 percent by weight of the total composition.

The resins useful in the present invention include Plastisol grade resins, suspension grade resins and blends of Plastisol resin with suspension grade resins. The Plastisol resins employed are the high molecular weight homopolymers of vinyl chloride and copolymers of vinyl chloride with up the 20 percent and preferably, less than 5 percent of acrylonitrile, vinylidene chloride, vinyl acetate, dialkyl maleate or other comonomer as conventionally employed in the Plastisol art. These resins are prepared by aqueous emulsion polymerization and thereafter spray dried according to well-known techniques in the art. The plastisol resins have a particle size in the range of about 0.2 to 2 microns, the average being about 1 micron, and are characterized by excellent "stir-in" properties which allow them to be readily dispersed in the liquid plasticizer at room temperature to form a paste-like mixture. Examples of Plastisol resins include Opalon 410 and 440, Exon 654, Geon 121, QYNV, and Marvinol 50 and 51, to name just a few.

By suspension resin is meant vinyl resins having a particle size in the range of approximately 30 to 300 microns produced by suspension polymerization techniques known to the art. The suspension resins, like the Plastisol resins, may be homopolymers of vinyl chloride or copolymers of vinyl chloride containing minor amounts of comonomer, but in comparison to Plastisol resins vary somewhat more widely in molecular weight. While suspension resins do not possess the stir-in characteristics found in the Plastisol resins, and this might normally be considered objectionable, it has been found that when these resins are employed in accordance with the invention, fluxed compositions exhibiting further improved resistance to moisture fogging and better sealing efficiency are obtained. As a result, it is preferred in the present invention to use resin blends containing suspension grade resins. The amount of suspension resin used may vary widely, for example, from 10 percent to 90 percent by weight of the total resin content with amounts of 60 percent and above being preferred due to the better transparency of the fluxed composition. Suspension grade resins useful in the preparation of the present clear Plastisol compositions include Geon 202, VC-265, Marvinol VR-10, Exon 666, Exon 667, and the like.

Among the plasticizers suitable for use in preparing the present Plastisol compositions are dialkyl phthalates, such as dioctyl phthalate, butyl decyl phthalate, octyl decyl phthalate, alkyl phthalyl alkyl glycolates, such as butyl phthalyl butyl glycolate, methyl phthalyl ethyl glycolate, and dialkyl esters of alkane dicarboxylic acids, such as dioctyl and dibutyl sebacates, didecyl azelate, diisobutyl adipate, and so forth. Also included are trialkyl and triaryl phosphates, acetyl trialkyl citrates, and other clear, colorless plasticizers, which will not impair the clarity of the fluxed composition. Mixtures of two or more of these plasticizers may be used and in addition, one or more secondary plasticizers may be used in conjunction with the primary plasticizers.

Other ingredients including conventional stabilizers, e.g. calcium and zinc stearates, alkyl tin mercaptides; viscosity modifying substances, e.g. polyethylene glycol fatty esters; thickeners, e.g., colloidal silica; wetting agents, and other conventional Plastisol compounding ingredients may also be incorporated into the Plastisol compositions of the present invention providing the compounds employed are restricted to substances which will not interfere with the clarity of the finished product. However, a preferred composition contains a stabilizer in addition to the resin, plasticizer and wax while another preferred composition contains a stabilizer and a thickener in addition to the basic components.

A cross-sectional view of a crown closure containing a fluxed vinyl resin Plastisol liner of this invention is shown in the accompanying drawing.

Referring to the figure, the crown shell which is shown inverted has a circular top portion 1 and a crimped skirt portion 2 joined by a smoothly curved top corner edge 3. The interior of the shell has an overall lacquer coating 4. Superimposed on the lacquer coating and adhered thereto is a vinyl resin sealing liner which has a thin central portion 5 and a substantially thicker annular sealing portion 6.

The following examples are given to illustrate the present invention more clearly. All quantities given are in parts by weight unless otherwise specified.

EXAMPLE 1

| Ingredient: | Parts by weight |
|---|---|
| Vinyl chloride homopolymer, "Exon 654"[1] (Plastisol resin) | 60 |
| Vinyl chloride copolymer "Geon 202"[2] (suspension resin) | 40 |
| Dioctyl phthalate (plasticizer) | 50 |
| Calcium-zinc stearates (stabilizer) | 0.7 |
| Microcrystalline wax (melting pt. approx. 155° F.) | 3 |

[1] A product of the Firestone Plastics Company.
[2] A product of the B. F. Goodrich Chemical Company.

A wax-plasticizer blend was formed by heating the wax in approximately 6 parts of plasticizer at a temperature between 140° and 150° F. The hot wax blend was then mixed with 30 parts of plasticizer that had been heated to a temperature between 110° and 120° F. The resulting mixture was stirred until it had cooled to about 120° F. at which time the Plastisol and suspension resins were introduced into the composition. The mixture was then stirred under vacuum for 30 minutes, the stabilizer added, and also the remaining amount of plasticizer. Thereafter, the composition was stirred under vacuum until it was substantially free from entrapped air.

Approximately 250 mgs. of this composition was deposited into each of a series of standard, lacquer-coated crown shells and the deposit shaped with the aid of a heated forming plunger at a temperature and pressure of about 300° F. and 30 p.s.i., respectively. The closures were thereafter placed in an oven maintained at a temperature of about 370° F. until the liners were completely fluxed.

The resultant liners possessed excellent transparency and were substantially free from moisture clouding after several months storage on liquid pressure packs.

EXAMPLE 2

| Ingredient: | Parts by weight |
|---|---|
| Polyvinyl chloride, "Opalon 440"[1] (Plastisol resin) | 79 |
| Polyvinyl chloride, "VC-265"[2] (suspension resin) | 21 |
| Dioctyl phthalate | 94.5 |
| Glycerol-adipate polymeric ester | 10.5 |
| Epoxidized soybean oil | 5 |
| Calcium-zinc stearates | 0.5 |
| Paraffin wax-melting pt., 117° F. | 1.5 |

[1] A product of Monsanto Chemical Company.
[2] A product of The Borden Company.

The paraffin was melted in a portion of dioctyl phthalate to give a wax blend containing about 2-2.5 parts plasticizer for each part wax. An additional amount of about 40 parts phthalate was added to the wax blend with stirring and stirring was continued until the temperature of the mixture had dropped to about 115° F. The stearates and polymeric plasticizer were added and after having been thoroughly blended, the Plastisol resin and then the suspension resin were stirred into the mixture. Finally, the soybean oil and the remainder of the phthalate were added and the composition stirred under vacuum for approximately 45 minutes to eliminate any air bubbles that may have formed in the composition during blending. Another composition without wax but containing the same constituents in the same proportions as given above was also formulated. A number of crown closure liners were prepared from these compositions employing conventional lining techniques and the assembled seals were immersed in water for 4 weeks. Upon visual inspection at the end of the moisture test, it was found that the liners containing wax were clear and non-fogged while the control liners without wax were badly clouded and essentially opaque.

EXAMPLE 3

| Ingredient: | Parts by weight |
|---|---|
| Polyvinyl chloride, "Opalon 440" | 91 |
| Polyvinyl chloride, "VC–265" | 9 |
| Dioctyl phthalate | 79.5 |
| Glycerol-adipate polymeric ester | 10.5 |
| Epoxidized soybean oil | 5 |
| Calcium-zinc stearates | 0.5 |
| Paraffin wax-melting pt., 117° F. | 3.5 |

The ingredients of the above composition were blended according to the same procedure described in Example 2 above. Crown liners prepared from the above composition were tested for moisture clouding by immersing the finished crowns in water for a period of about 4 weeks. Upon inspection the liners were found to be clear and free from moisture clouding.

EXAMPLES 4–7

Three Plastisol compositions, each containing a different wax as listed in Table I below, were prepared according to the following basic recipe.

TABLE I

| Example | Wax (approx. m. pt.) | Clarity |
|---|---|---|
| 4 | Paraffin (118° F.) | Excellent. |
| 5 | Microcrystalline (143° F.) | Do. |
| 6 | Microcrystalline (155° F.) | Do. |
| Control | | Poor. |

From the results given in Table I above, it is readily apparent that the different petroleum waxes were highly effective in preventing moisture clouding of the fluxed vinyl resin liners as prepared in Examples 4–6. Moreover, significant improvement in anti-fogging characteristics were found in liners prepared from the above formulation containing reduced amounts of petroleum wax, e.g., at a level of only 0.5 part.

Another series of crown liners were prepared from Plastisol compositions containing large proportions of suspension resin in the resin component and were then immersed in water for a period of approximately one week. The formulations and results of the moisture test are given in Table II below.

TABLE II

| Ingredient | Example | | | | | |
|---|---|---|---|---|---|---|
| | 7 | 8 | 9 | 10 | 11 | 12 |
| Plastisol resin, Geon 121 | 120 | 120 | 240 | 240 | 600 | 600 |
| Suspension resin, Geon 202 | 480 | 480 | 360 | 360 | 0 | 0 |
| Dioctyl phthalate | 420 | 420 | 420 | 420 | 420 | 420 |
| Calcium-zinc stearate | 3 | 3 | 3 | 3 | 3 | 3 |
| Paraffin, approx. m. pt. 123°–125° F | 16 | | 16 | | 16 | |
| Clarity | Excellent | Fair | Excellent | Fair | Excellent | Poor |

| Ingredient: | Parts by weight |
|---|---|
| Polyvinyl chloride "Opalon 440" (Plastisol resin) | 340 |
| Polyvinyl chloride "VC – 265" (suspension resin) | 60 |
| Dioctyl phthalate | 294 |
| Glycerol-adipate polymeric ester | 30 |
| Epoxidized soybean oil | 20 |
| Calcium-zinc stearates | 2 |
| Aerated colloidal silica | 16 |

A quantity of 1.5 parts wax was employed in each example. The wax in each case was melted in a portion of about 5 parts dioctyl phthalate and another blend containing the thickener was prepared by ball milling the colloidal silica with approximately 160 parts of phthalate. The blend containing the thickener was added to the wax blend and the resulting mixture was stirred for about 5–10 minutes. Next, the polymeric plasticizer was incorporated into the mixture and stirring was continued until the temperature had dropped to about 115° F. at which time the Plastisol resin and then the suspension were added. After stirring under vacuum for about 1 hour, the stearates and soybean oil were added to the mixture. Finally, the remainder of the phthalates was added, and the composition again stirred under vacuum until free from entrapped air.

Sample crown liners were prepared from the composition of each example using conventional spin-lining techniques. The assembled crowns were immersed in water for approximately one month and the liners thereafter inspected for moisture clouding.

From the results of the moisture test for comparative Examples 7–12, it can be seen that the addition of paraffin wax greatly improved the anti-fogging characteristics of the fluxed compositions which otherwise would be unsuitable for use as liners or gaskets exposed to a humid environment.

Other than the quantity of wax and the amounts of Plastisol and suspension resin comprising the resin component, the proportions of the other ingredients of the Plastisol may vary widely. For example, 50 to 200 parts plasticizer and 0.5 to 10 parts stabilizer may be used based on 100 parts resin. When a thickener is employed, it may be present in an amount from 2 to 20 parts per 100 parts of resin.

It will be understood that the compositions of the present invention while particularly useful in the preparation of transparent, non-fogging liners for crown closures may also be used in the formulation of gaskets and liners for other types of container closures as well as in other applications where optimum transparency and resistance to moisture fogging is required.

What is claimed is:

1. A Plastisol composition consisting essentially of 100 parts by weight of a vinyl chloride resin mixture of a Plastisol resin having a particle size in the range of about 0.2 to 2 microns and a suspension resin having a particle size in the range of about 30 to 300 microns, between about 50 and 200 parts by weight of a plasticizer for said resin mixture and petroleum wax in an amount below two percent by weight of the total composition, said composition being transparent upon fluxing.

2. A Plastisol composition according to claim 1 wherein said petroleum wax is paraffin wax.

3. A Plastisol composition according to claim 1 wherein said petroleum wax is microcrystalline wax.

4. A Plastisol composition according to claim 1 wherein the suspension resin constitutes from 10 percent to 90 percent by weight of the total resin used.

5. A Plastisol composition which is transparent on fluxing consisting essentially of 100 parts by weight of a vinyl resin mixture containing a polyvinyl chloride Plastisol resin having a particle size in the range of about 0.2 to 2 microns and a polyvinyl chloride suspension resin having a particle size in the range of about 30 to 300 microns, between 50 and 200 parts by weight of di-octyl phthalate, between 0.5 and 10 parts by weight of a stabilizer, between 2 and 20 parts by weight of a thickener, and paraffin wax in an amount below two percent by weight of the total composition.

References Cited

UNITED STATES PATENTS 2,181,481  11/1939  Gray.
2,528,507  11/1950  Foye.

MORRIS LIEBMAN, *Primary Examiner.*

LESLIE H. GASTON, *Examiner.*

D. C. KOLASCH, H. S. KAPLAN, *Assistant Examiners.*